(12) United States Patent
Yamanis et al.

(10) Patent No.: US 8,574,782 B2
(45) Date of Patent: Nov. 5, 2013

(54) FUEL CELL REPEATER UNIT INCLUDING FRAME AND SEPARATOR PLATE

(75) Inventors: Jean Yamanis, South Glastonbury, CT (US); Justin R. Hawkes, Marlborough, CT (US); Louis Chiapetta, Jr., South Windsor, CT (US); Connie E. Bird, Rocky Hill, CT (US); Ellen Y. Sun, South Windsor, CT (US); Paul F. Croteau, Columbia, CT (US)

(73) Assignee: UTC Power Corporation, South Windsor, CT (US)

( * ) Notice: Subject to any disclaimer, the term of this patent is extended or adjusted under 35 U.S.C. 154(b) by 348 days.

(21) Appl. No.: 12/770,032

(22) Filed: Apr. 29, 2010

(65) Prior Publication Data

US 2010/0209800 A1    Aug. 19, 2010

Related U.S. Application Data

(63) Continuation-in-part of application No. 12/679,772, filed as application No. PCT/US2008/080671 on Oct. 22, 2008.

(30) Foreign Application Priority Data

Oct. 22, 2008    (of) .................. PCT/US2008/080671

(51) Int. Cl.
| | |
|---|---|
| *H01M 2/38* | (2006.01) |
| *H01M 2/40* | (2006.01) |
| *H01M 8/24* | (2006.01) |

(52) U.S. Cl.
USPC ........... 429/458; 429/452; 429/454; 429/456; 429/457

(58) Field of Classification Search
USPC .......................... 429/457, 452, 454, 456, 458
See application file for complete search history.

(56) References Cited

U.S. PATENT DOCUMENTS

| | | | |
|---|---|---|---|
| 6,921,602 B2 * | 7/2005 | Diez et al. | ..................... 429/456 |
| 7,374,834 B2 | 5/2008 | Jewulski et al. | |

(Continued)

FOREIGN PATENT DOCUMENTS

| | | |
|---|---|---|
| JP | 2004119189 | 4/2004 |
| WO | WO2005034277 A1 | 4/2005 |
| WO | WO2007021280 | 2/2007 |
| WO | WO 2007083838 A1 * | 7/2007 |

OTHER PUBLICATIONS

Search Report and Written Opinion mailed on Jun. 26, 2009 for PCT/US2008/08061.

*Primary Examiner* — Sean P Cullen
(74) *Attorney, Agent, or Firm* — Carlson, Gaskey & Olds P.C.

(57) ABSTRACT

An example fuel cell repeater includes a separator plate and a frame establishing at least a portion of a flow path that is operative to communicate fuel to or from at least one fuel cell held by the frame relative to the separator plate. The flow path has a perimeter and any fuel within the perimeter flow across the at least one fuel cell in a first direction. The separator plate, the frame, or both establish at least one conduit positioned outside the flow path perimeter. The conduit is outside of the flow path perimeter and is configured to direct flow in a second, different direction. The conduit is fluidly coupled with the flow path.

7 Claims, 11 Drawing Sheets

(56) References Cited

U.S. PATENT DOCUMENTS

| | | |
|---|---|---|
| 2002/0076592 A1* | 6/2002 | Sato et al. .................. 429/26 |
| 2005/0079400 A1 | 4/2005 | Sugiura et al. |
| 2006/0210858 A1 | 9/2006 | Warrier et al. |
| 2007/0072052 A1* | 3/2007 | An et al. .................. 429/38 |
| 2007/0087248 A1* | 4/2007 | Fujibayashi .................. 429/33 |
| 2007/0196711 A1* | 8/2007 | Takeguchi et al. .............. 429/30 |
| 2007/0212585 A1* | 9/2007 | Endo et al. .................. 429/33 |
| 2009/0098435 A1* | 4/2009 | Shibata et al. .................. 429/32 |

* cited by examiner

FUEL CELL REPEATER UNIT INCLUDING FRAME AND SEPARATOR PLATE

RELATED REFERENCES

This application is a continuation-in-part of U.S. patent application Ser. No. 12/679,772, filed Mar. 24, 2010, which is a National Phase application of International Application No. PCT/US2008/080671. These applications are each incorporated herein by reference.

STATEMENT REGARDING FEDERALLY SPONSORED RESEARCH

This invention was made with United States Government support under Contract No. DE-FC26-01NT41246 awarded by the Department of Energy. The United States Government may have certain rights in this invention.

TECHNICAL FIELD

This disclosure relates generally to fuel cells and, more particularly, to repeater units that facilitate fuel cell fluid communication through a fuel cell stack assembly.

DESCRIPTION OF RELATED ART

Fuel cell stack assemblies are well known. Some fuel cell stack assemblies include multiple repeater units arranged in a stacked relationship. The repeater units each typically include a fuel cell, such as a solid oxide fuel cell (SOFC), that has an electrolyte layer positioned between a cathode electrode layer and an anode electrode layer. Providing the SOFC with a supply of fuel and air generates electrical power in a known manner. An interconnector near the anode electrode layer and another interconnector near the cathode electrode layer electrically connect the repeater unit to an adjacent repeater unit in the stack.

As known, some fuel cell stack assemblies rely on complex arrangements for delivering supplies of fuel and air to the SOFC within each repeater unit. Adding more repeater units to the fuel cell stack assembly typically increases the size and complexity of the delivery arrangement because each repeater unit includes an SOFC requiring an evenly distributed supply of fuel and air. One example prior art arrangement includes multiple repeater units that each have a complex pattern of holes for fuel delivery and another pattern of holes for air delivery. Aligning these holes is difficult and time consuming. Achieving durable hermetic sealing between complex air and fuel holes is challenging.

What is needed is a simplified arrangement for delivering supplies of fuel and air to an SOFC and for distributing air and fuel uniformly at the electrodes.

SUMMARY

An example fuel cell repeater includes a separator plate and a frame establishing at least a portion of a flow path that is operative to communicate fuel to or from at least one fuel cell held by the frame relative to the separator plate. The flow path has a perimeter and any fuel within the perimeter flows across the at least one fuel cell in a first direction. The separator plate, the frame, or both establish at least one conduit positioned outside the flow path perimeter. The conduit is outside of the flow path perimeter and is configured to direct flow in a second, different direction. The conduit is fluidly coupled with the flow path.

An example fuel cell stack assembly includes at least one fuel cell repeater that establishes a plurality of fuel flow paths for communicating fuel to a position in the same plane and adjacent at least one fuel cell. A duct houses the at least one fuel cell repeater. The duct is configured to guide airflow through the at least one fuel cell repeater.

These and other features of the disclosed examples can be best understood from the following specification and drawings. The following is a brief description of the drawings.

DETAILED DESCRIPTION

Figure 1:
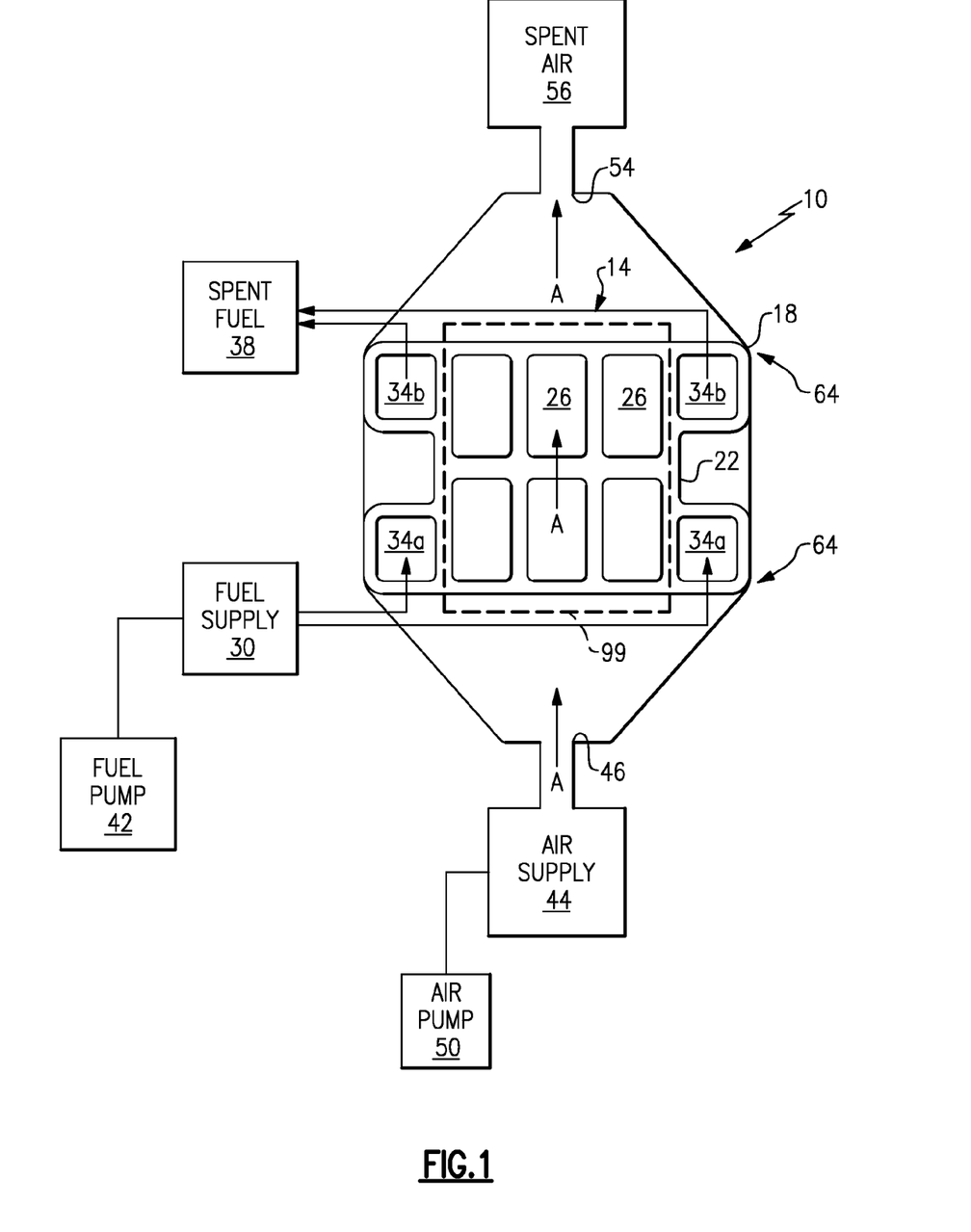
FIG. 1 shows a schematic sectional view of an example fuel cell arrangement having 6 fuel cells in a 2×3 matrix configuration.
Figure 2:
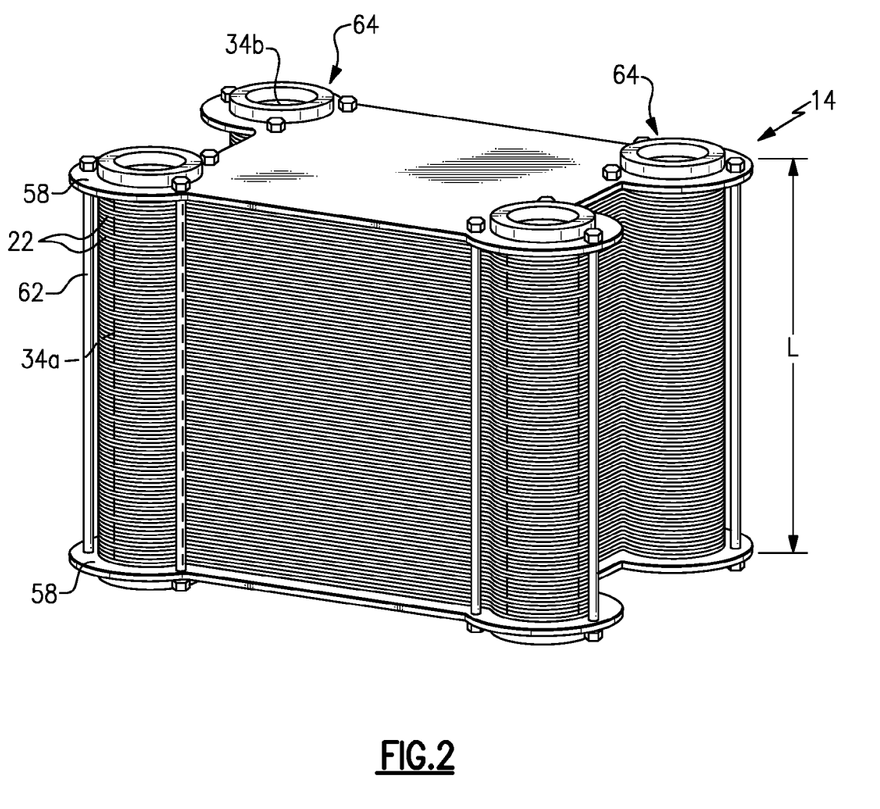
FIG. 2 shows an example fuel cell stack assembly.
Figure 3:
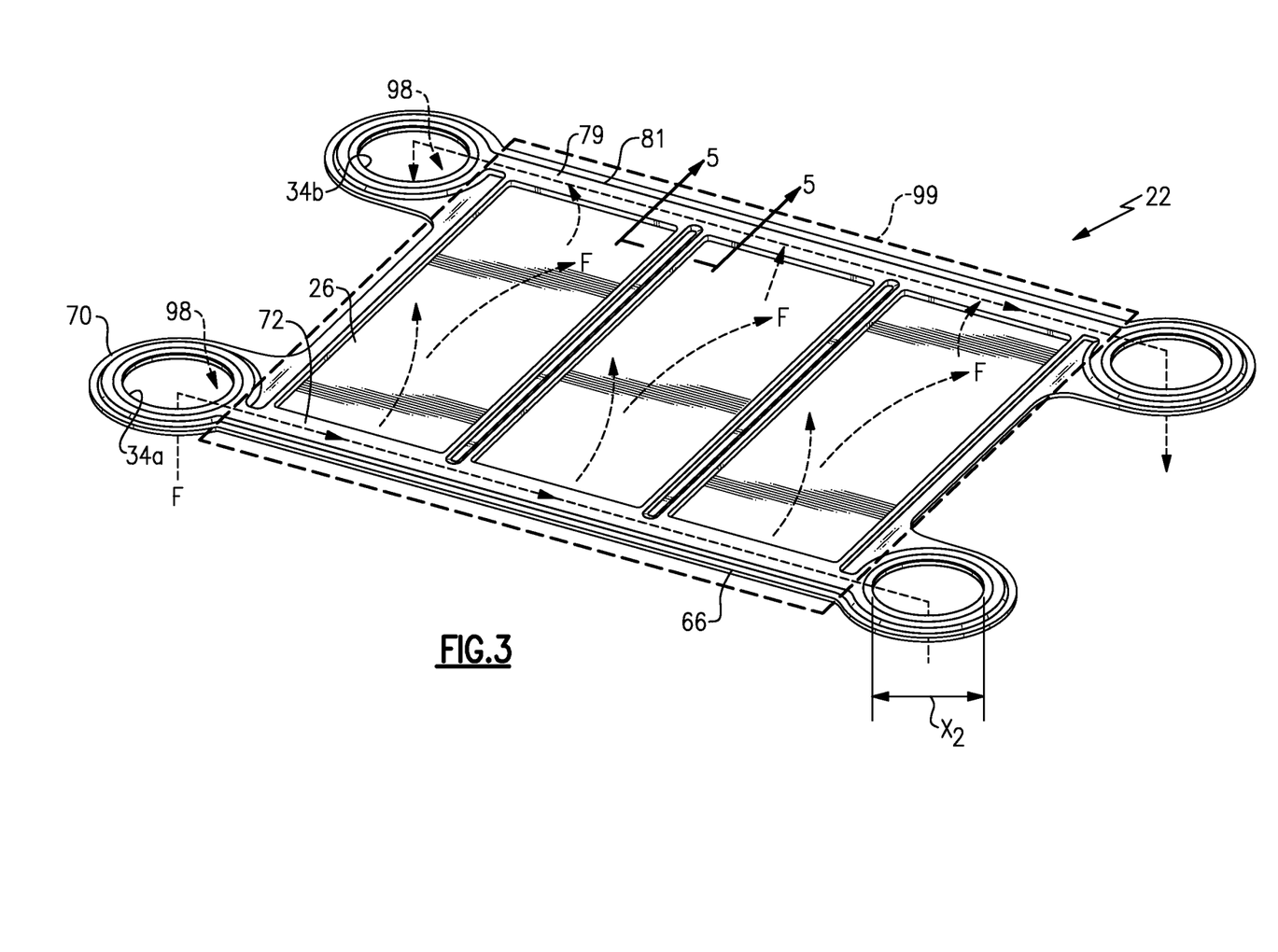
FIG. 3 shows a perspective view of an example repeater unit.

Referring to FIG. 1, an example fuel cell arrangement 10 includes a fuel cell stack assembly 14 housed within a duct 18. The fuel cell stack assembly 14 includes multiple repeater units 22. In this example, each of the repeater units 22 includes a plurality of tri-layer solid oxide fuel cells (SOFC) 26 that are arranged in a 2×3 matrix and aligned within the same plane. Other examples include different numbers of the SOFCs 26, such as a single SOFC, and different arrangements, such as a 3×3 matrix or a 4×2 matrix. The SOFCs utilize supplies of fuel and air to generate electrical power in a known manner. The M×N matrix of fuel cells in a plane, where M, the number of rows, or N, the number of columns, is an integer equal or greater than 1, is referred to as the window frame design.

The tri-layer solid oxide fuel cells 26 discussed herein are planar and comprise the anode electrode layer, the electrolyte layer, and the cathode electrode layer. The electrolyte layer is sandwiched between the anode electrode and the cathode electrode. In all the drawings, FIG. 1-9, the anode electrode faces down. The anode electrode may face up as another example.

In this example, a fuel supply reservoir 30 provides fuel that is directed through at least one conduit 34a to the repeater unit 22. The at least one conduit 34a is partially established by the repeater unit 22 in this example. Spent fuel is directed from the SOFC 26 to at least one second conduit 34b and then away from the repeater unit 22. In this example, a spent fuel reservoir 38 holds spent fuel. A fuel pump 42 facilitates moving fuel through the repeater unit 22.

In this example, an air supply 44 provides air that is directed to the duct 18 through an air inlet 46. Within the duct 18, air moves across the repeater unit 22 and leaves the duct 18 through an air outlet 54. Air inlet 46 and air outlet 54 can be located in a variety of duct 18, any vertical face, bottom face, or top face. The SOFC 26 uses the oxygen in the air for the electrochemical reaction and releases spent air, i.e., air with reduced oxygen content, through the air outlet 54. This example includes a spent air reservoir 56. An air pump 50 facilitates moving air to the duct 18 and across the repeater unit 22. In some examples, the fuel supply reservoir 30, the spent fuel reservoir 38, the air supply 44, and the spent air reservoir 56 also denote piping connections or junctions between the fuel cell arrangement 10 and a fuel cell system or power plant comprising multiples of the fuel cell arrangement 10.

Referring to FIGS. 2-5, the fuel cell stack assembly 14 holds multiple repeater units 22 together between end plates 58. Bolts 62, or similar mechanical fasteners, or an external loading mechanism, secure the example components together. The corner portions 64 of the repeater units 22 and the end plates 58 establish the fuel cell conduits 34a and 34b, which have a generally circular cross-section in this example. The conduits 34a and 34b in the example of FIG. 1 have a rectangular cross section. The length L of the conduits 34a and 34b corresponds generally to the height of the fuel cell stack assembly 14. The conduits 34a and 34b will also be referred to as the primary fuel manifolds.

The example individual repeater units 22 each include a cell frame 70 secured to separator plate 66 to form a cassette-like structure. In one example, the separator plate 66 and the cell frame 70 are welded at their outer perimeters to effectively hermetically seal the fuel gas space in the fuel cell stack assembly 14.

The separator plate 66 and the cell frame 70 include holes that establish a portion of the conduits 34a and 34b in this example. Together, a plurality of the separator plates 66 and cell frames 70, and the sealant material 92 located therebetween and around conduits 34a and 34b, establish the conduits 34 when they are in a cell stack assembly 14.

The SOFCs 26 and corresponding flat wire mesh interconnects 74, which is also referred to as the anode-side interconnect, are held between the cell frame 70 and the separator plate 66. For the flat wire mesh interconnect with wire diameter ranges from 0.5 to 2 mm, and the wire composition is selected from the group of nickel, copper, and nickel-copper alloys. In another example, the flat wire mesh interconnects 74 comprise corrugated expanded metal. For the corrugated wire mesh, the wire diameter ranges from 0.125 mm to 0.250 mm, and the wire composition is selected from the group of nickel-based alloys, nickel-chromium alloys, including Haynes 230, Inconels, and Hastelloys. In yet another example, the flat wire mesh interconnects 74 are replaced with dimples extending from the separator plate 66. In yet another example, the flat wire mesh interconnects 74 are replaced with sheets of metallic foam. For metallic foam, the material is selected from nickel foams, copper foams, or nickel-copper alloy foams.

Each repeater unit 22 holds multiple SOFCs 26 within the same plane in this example. Openings 78 through the cell frame 70 leave a portion of the SOFCs 26 exposed. In this example, the openings 78 are larger than the cathode electrode layer of the SOFCs 26. The example openings 78 have a rectangular profile. The cell frame 70 contacts the electrolyte surface of the SOFCs 26 at a joint 71 made of glass, glass ceramics, ceramics, metal oxides, metal brazes or a combination of them.

Some portions of the cell frame 70 are spaced from the separator plate 66 to provide a fuel channel 72, which comprises a trough-like cavity extending along the front and the back of the repeater unit 22, the front being ahead of the first row of cells and the back being after the last row of cells in the repeater unit. Fuel moving within the repeater unit 22 flows within the fuel channel 72 and across the fuel cells 26. The flow channel 72 will also be referred to as the secondary fuel manifold.

In some examples, the cell frame 70 comprises a stamped piece. The equipment stamping the cell frame 70 is configured to deform the relatively planar stock material to establish the portion of the cell frame 70 that corresponds to the fuel channel 72 and accommodates the heights of the anode side interconnect 74, the fuel cell 26, the height of the bonding materials that may be used to bond the interconnect 74 to the anode electrode of the fuel cell 26, and the height of the sealing materials that are used to bond and seal the top electrolyte surface at the periphery of the fuel cell 26 to the corresponding underside surface of cell frame 70. The bonding and sealing materials are not shown in the drawings. The stamping operation moves a first portion 79 of the cell frame 70 away from a second portion 81. In this example, the amount of movement, and relative deformation, between the first portion 79 and the second portion 81 corresponds to a height h, which is the approximate sum of the heights of the SOFC 26, the anode side interconnect 74, and any bonding materials that may be bond the anode side interconnect 74 to the separator plate 66 and to the anode electrode of the SOFCs 26.

Figure 11:
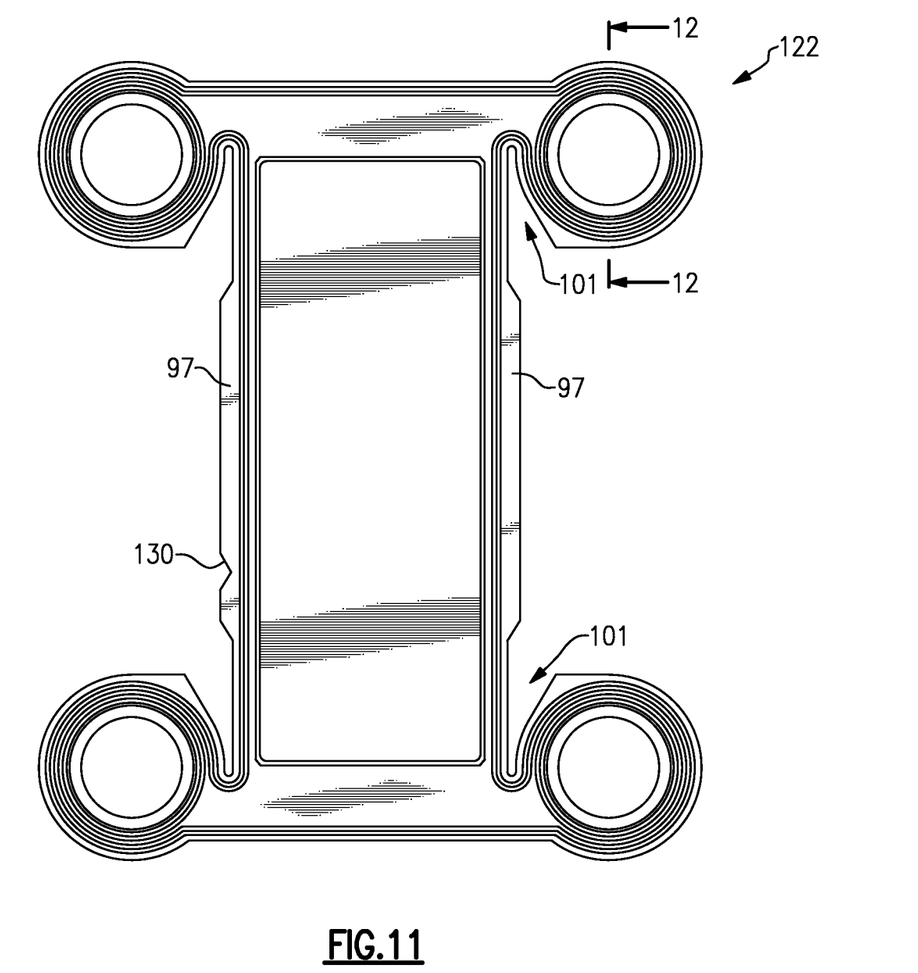
FIG. 11 shows a top view of the FIG. 10 repeater unit.

The frame stamping operation moves second portion 181 and third portion 183, FIG. 11, around conduits 134a to essentially bridge the height between the top surface of a first separator plate 66 and the bottom surface of a second separator plate disposed of immediately above said first separator plate.

The openings 78 and the openings 34a and 34b are formed either during the stamping step or by machining after the stamping operation by any suitable and cost-effective machining operations such as milling, electron discharge machining (EDM), laser slicing. The space created between the first portion 79 and the cell frame 70 receives portions of the SOFC 26 and the anode side interconnect 74. The openings 78 are smaller than the dimensions of the anode electrode and electrolyte layer, and larger than the cathode of the SOFC 26. Thus, the space created between the first portion 79 and the cell frame 70 receives the anode electrode and electrolyte layer of the SOFC 26, and the cathode of the SOFC 26 extends into or through the opening.

The second portion 81 of the cell frame 70 is then secured to the separator plate 66 by welding a continuous welding bead along the exterior perimeter of the separator plate 66 and the cell frame 70. The second portion 81 of the cell frame 70 is secured to the separator plate 66 by a sufficient number of spot welds 93 between adjacent SOFCs 26.

A seal 92 seals the interface between adjacent repeater units 22 that combine to establish the conduits 34a and 34b. In one example, each seal 92 comprises an O-ring-like structure having a V-, C-, or ∈-shaped cross-section. One side of the seal 92 is welded to the cell frame 70 in the openings 34a and 34b. The opposite side of the seal 92 is bonded to the underside of the separator plate 66 corresponding to the adjacent repeater unit 22 within the stack. This bonding is achieved by means of dielectric materials or through another set of materials and processes that ensure dielectric separation between adjacent repeater units 22. The bonding dielectric materials for sealing may be glass, glass ceramics, glass-metal composites, glass-metal oxide composites or their combination. The bonding materials may also be chosen appropriate metallic materials provided that the seal 92 or the respective area of the separator plate 66 are equipped with a dielectric skin that has adequate voltage breakdown strength to ensure dielectric isolation of the repeater units 22 in a stack. These bonding materials will also be referred to as sealing materials.

In another example, a plurality of inserts 94 that have a thickness essentially equal to the distance between the first portion 79 and the second portion 81 of the cell frame 70 are positioned between the cell frame 70 and the separator plate 66 each permit fuel flow between the respective conduit 34a and 34b and the fuel channel 72. The inserts 94 do not seal a closed periphery and have an opening corresponding to the width of the fuel channel 72. The example inserts 94 need only be spot-welded to either the cell frame 70 or the separator plate 66 in this example so as to keep the opening of the insert 94 aligned with the fuel channel 72. The inserts 94 support the corresponding area of the cell frame 70 around the conduits 34a and 34b so that a compressive load can be applied to the seals 92 to achieve sealing around the conduits 34a and 34b and maintain the integrity of the seal 92 in a stack.

In another example, the first portion 79 of the cell frame 70 is displaced, by the stamping process for example. The displacement is of a sufficient amount that the displaced portion, and associated bonding materials, spans between the cell frame 70 and the underside of the adjacent separator plate 66. The inserts 94 in such an example have the appropriate thickness to provide structural support to the sealing portion of the cell frame sheet around the conduits 34a and 34b.

In this example, the conduits 34a and 34b are positioned near the perimeter corners of the cell frame 70 and the separator plate 66, and the direction of fuel flow through the conduits 34a and 34b is perpendicular to the direction of fuel flow across the SOFCs 26. Adjusting the cross-sectional area $X_2$ of the conduits 34a and 34b alters characteristics of flow through the conduits 34a and 34b. The value of $X_2$ is chosen so as to ensure near uniform distribution of fuel to the repeater units in a stack. For example, utilizing the round cross-sections of FIGS. 2-8 may facilitate sealing the conduits 34a and 34b and lead to durable, robust seals with respect to thermal cycling. Utilizing the rectangular cross-sections of FIG. 1 may desirably reduce the amount of material in the repeater unit 22.

The conduits 34a and 34b may include other cross-sectional geometries. Regardless the chosen geometry of the conduits 34a and 34b, the sum of the four conduit perimeters is smaller than the perimeter of other internally manifolded repeater units in the prior art that are sealed by dielectric materials, i.e., glass ceramics, in assembling a stack.

Figure 4:
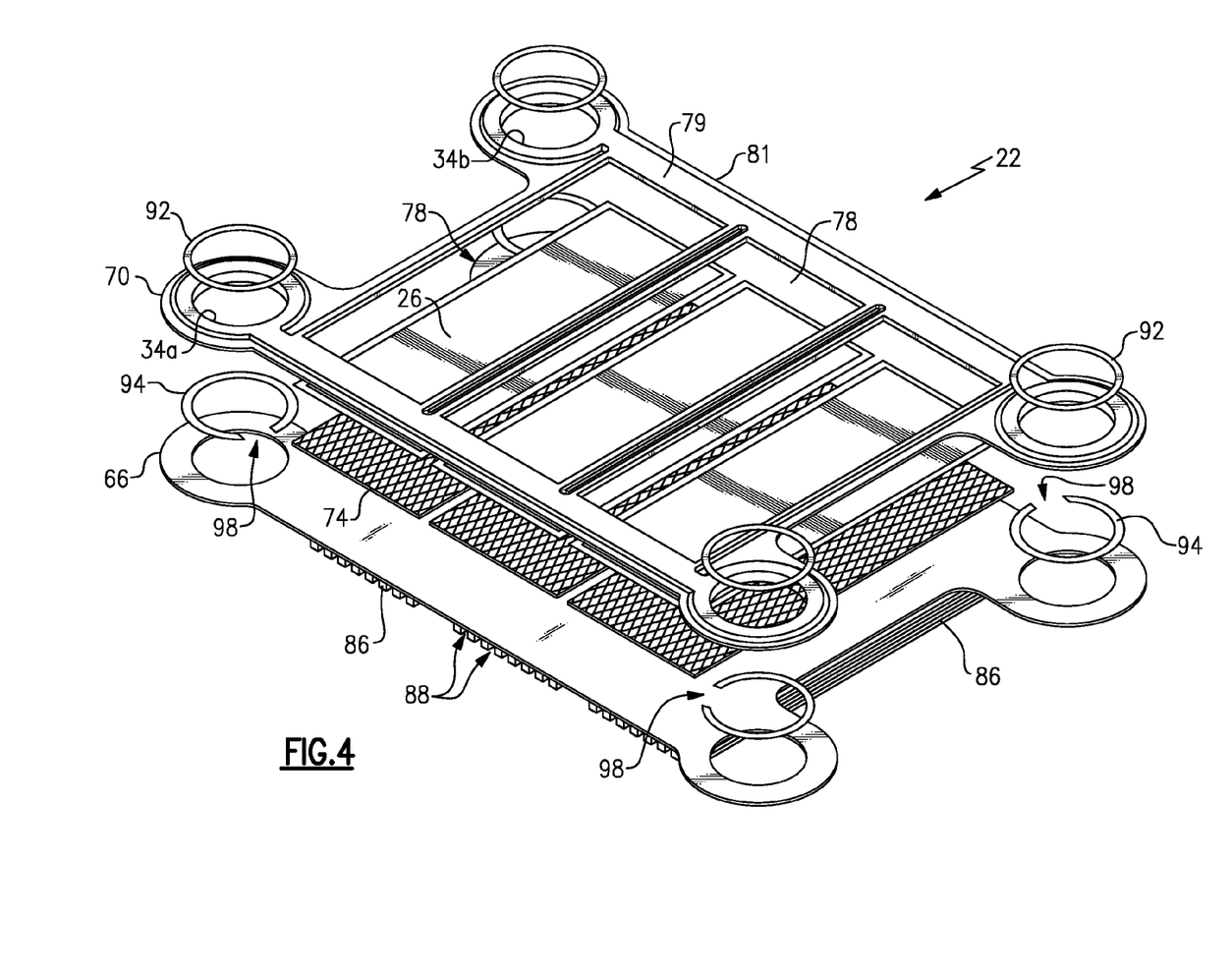
FIG. 4 shows an exploded view of the FIG. 3 repeater unit.
Figure 5:
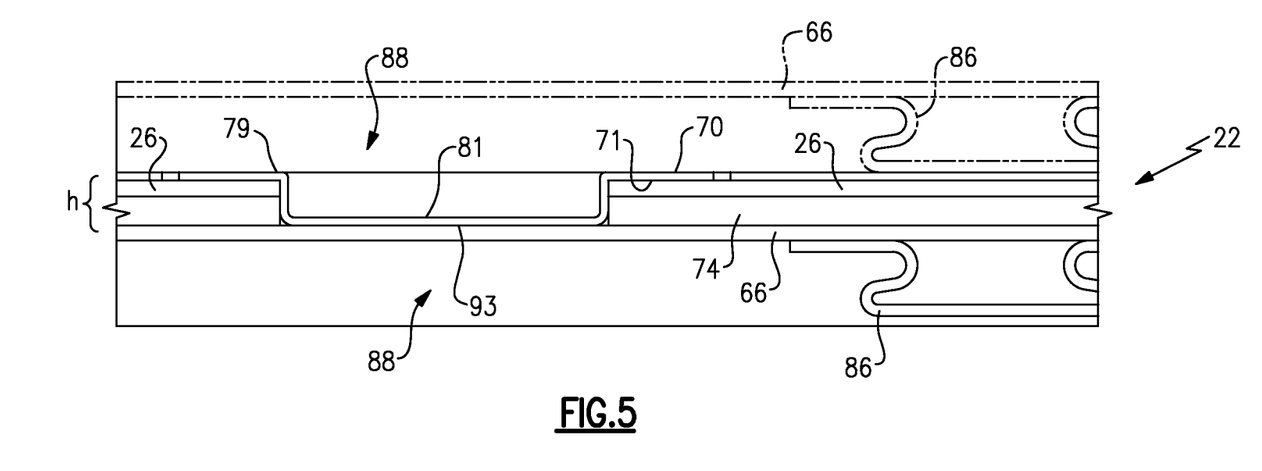
FIG. 5 shows a sectional view through line 5-5 of FIG. 3.

A wire mesh interconnect 86 is secured to the underside of the separator plate 66 by means of welding, seam welding, brazing, diffusion bonding or a combination of these. The wire mesh interconnect 86 is corrugated and defines a plurality of channels 88 for directing air flow across cathode electrode side of the SOFCs 26 and of the repeater unit 22 through the stack assembly 14. The channels 88 are open toward the SOFCs 26 to facilitate the transport of oxygen to the cathode electrode of the SOFCs 26 for the electrochemical reaction. In this example, the corrugated wire mesh interconnect 86 has a dovetail cross-sectional profile.

The example wire mesh interconnect 86 is a compliant structure with well-defined deformation characteristics, which can be used to design the mechanical load that can be applied to the fuel cell 26. This approach facilitates adequate contact between the wire mesh interconnect 86 and the SOFCs 26 and minimal interface ohmic resistance. The approach also lessens the potential for fracturing the SOFC 26 and accommodates the dimensional variability of production repeater units 22 of large footprint area, which reduces material and fabrication costs.

The example wire mesh interconnect 86 is bonded to the cathode electrode by means of appropriate ceramic materials, such as perovskite or spinel materials. This approach lessens the ohmic resistance to electron flow and resists changes to the ohmic resistance across the wire mesh interconnect 86 and cathode electrode of the SOFC 26. This approach also indirectly lessens the mechanical load across the stack. Changes in the ohmic resistance typically arise from potential thermal stresses during thermal cycling. Minimization of the mechanical load or stress also leads to minimization of the potential for interconnect creep under the operating conditions, since creep deformation is a function of material properties and stress.

In this example, the metal alloy selected for the wire mesh interconnect 86 is a nickel-based alloy that exhibits excellent oxidation and creep resistance at the fuel cell operating temperatures of 650° C. to 900° C. thus ensuring good electrochemical performance stability and long lifetime for the fuel cell stack. The wire mesh interconnect 86 is coated with chromia-containment materials to further enhance performance stability and lifetime in some examples.

In one example, the wire mesh interconnect 86 is compliant and is bonded to one side or extended surface of the separator plate 66 while the flat wire mesh interconnects 74 are bonded to the opposite side of the separator plate 66 to form a bipolar plate. Example bonding techniques include brazing, welding, seam welding, diffusion bonding and other metal bonding methods well known in the art. The wire mesh interconnect 86, the flat wire mesh interconnect 74, and the separator plate 66 are made from different metals or alloys to provide enhanced oxidation, corrosion, and creep resistance and mitigation of thermal stresses that may arise during thermal cycling.

The example corrugated wire mesh interconnect 88 is made of a nickel based alloy, such as Haynes 230, which has excellent oxidation and creep resistance in air at the fuel cell operating temperatures of 650° C. to 900° C., the flat wire mesh interconnects 74 is made of pure nickel wire which is very stable in the fuel environment, and the separator plate 66 is made of iron-chromium alloys that offer adequate matching of thermal expansion characteristics to those of the ceramic fuel cells to ensure the integrity of the fuel cell stack under thermal cycling between the ambient and fuel cell operating temperatures. For the wire mesh interconnect 88, the wire diameter ranges from 0.125 to 0.250 mm.

Figure 6:
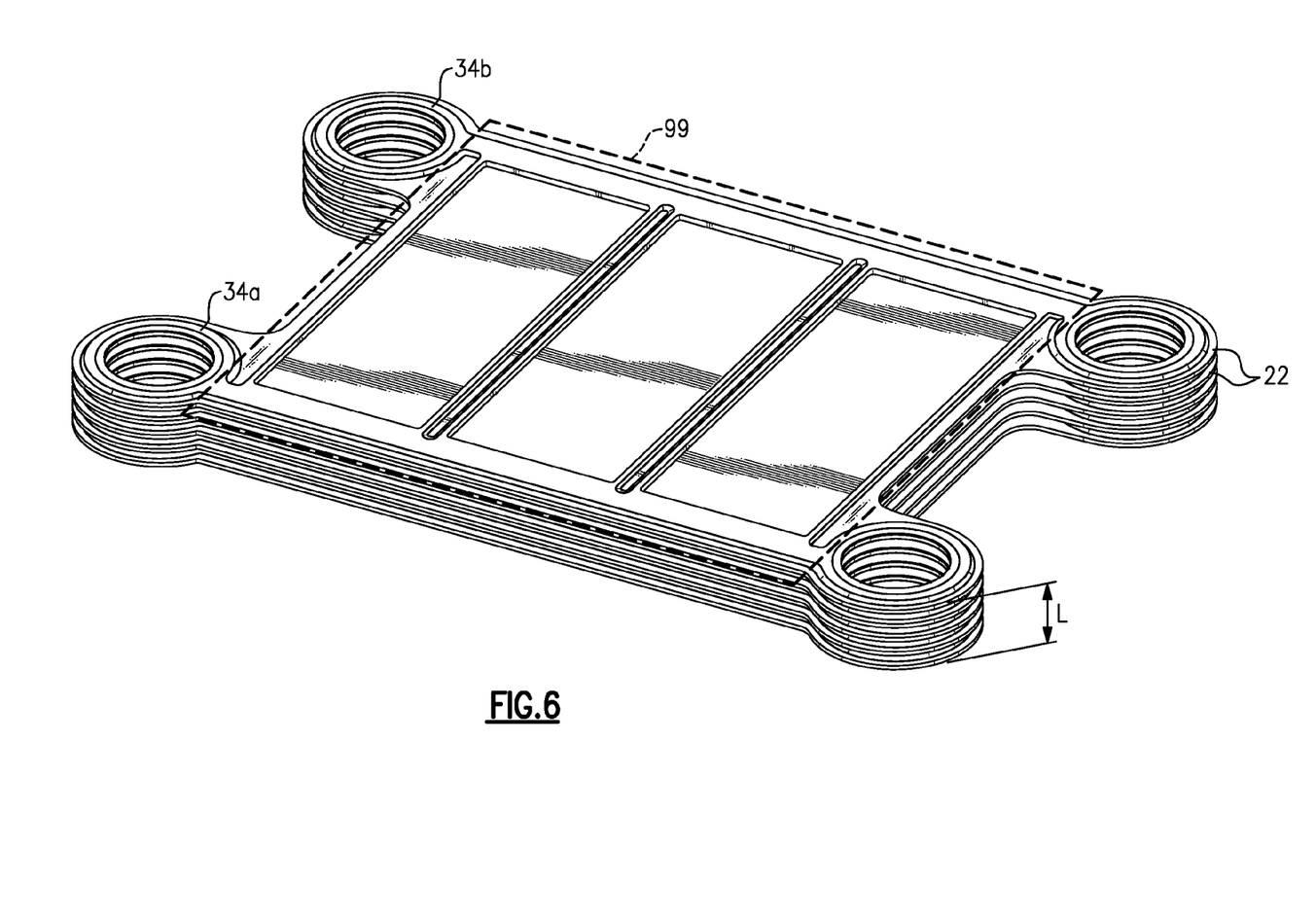
FIG. 6 shows an example stack of the FIG. 3 repeater units.
Figure 7:
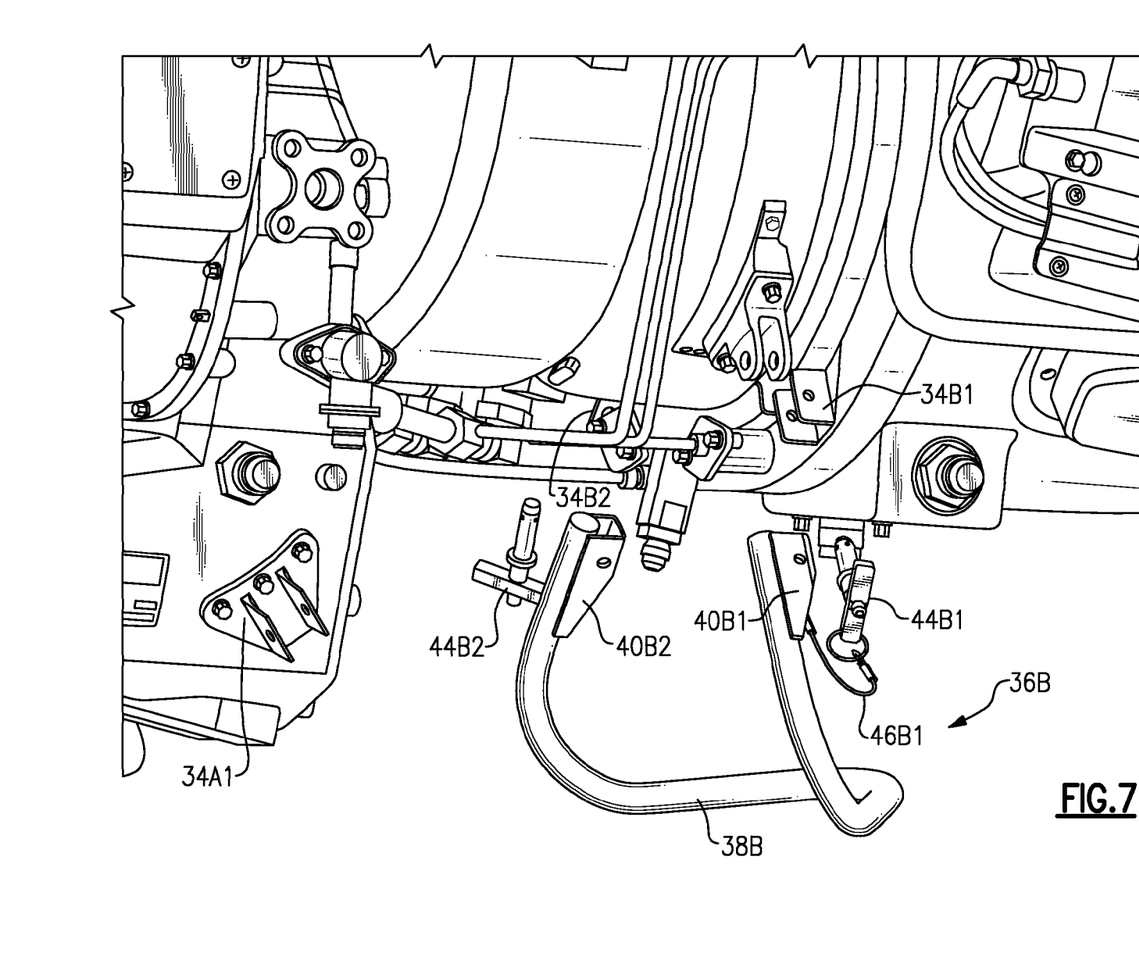
FIG. 7 shows a sectional view through a portion of the FIG. 6 stack.

Referring now to FIGS. 6 and 7, stacking a plurality of repeater units 22 with another repeater unit 22 establishes a length L of the conduits 34a and 34b. Fuel is distributed from the conduits 34a through the space 98 in the inserts 94 into the fuel channels 72 to the SOFCs 26.

Each repeater unit 22 establishes a fuel channel perimeter 99 that surrounds all of the SOFCs 26 within that repeater unit 22. In this example, the fuel channels 72 upstream, with regard to the direction of fuel flow, and downstream of the SOFCs 26 are positioned within the fuel channel perimeter 99. That is, perimeter surrounds all of the fuel flow in a direction aligned with the SOFCs 26. The conduits 34a and 34b are positioned outside the fuel channel perimeter 99. The fuel channel perimeter 99 is aligned with the space 98 in this example, which establish the transition from the channels 34a and 34b to the fuel channels 72 adjacent the SOFCs 26 of the repeater unit 22. The dimensions (the width and height) of the fuel channels 72 are designed so as to ensure essentially uniform flow distribution across the fuel cells 26 in each repeater unit 22 of a fuel cell 14.

Figure 8:
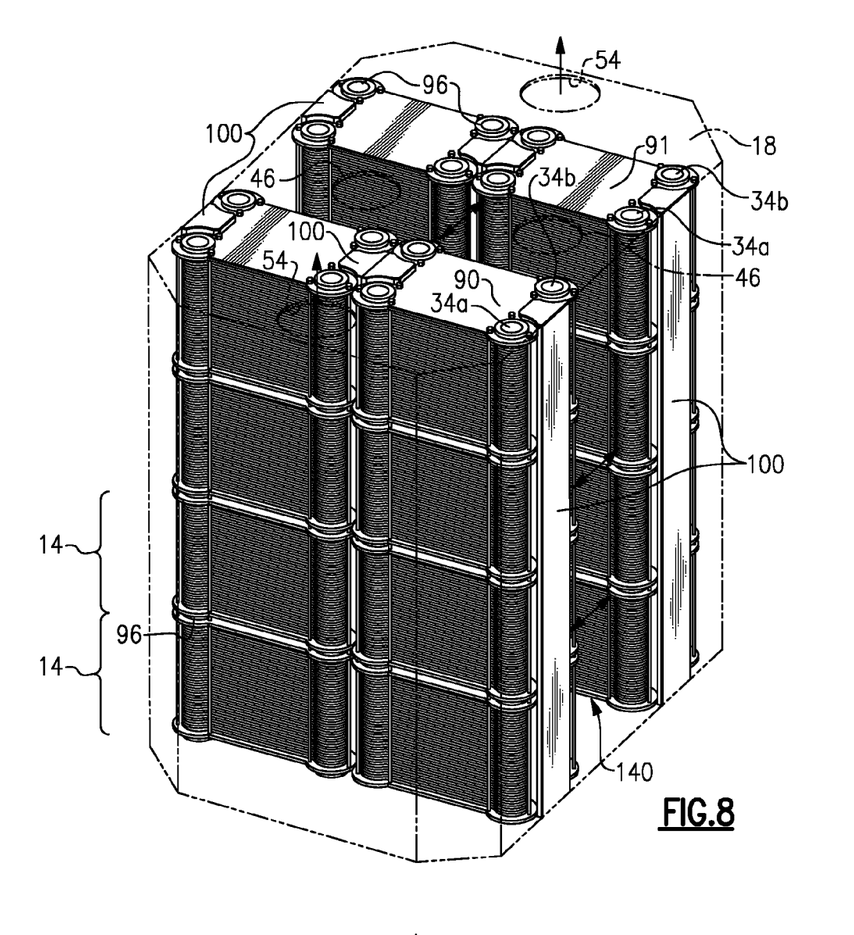
FIG. 8 shows a perspective view of an example fuel cell arrangement having multiple fuel cell stack assemblies.
Figure 9:
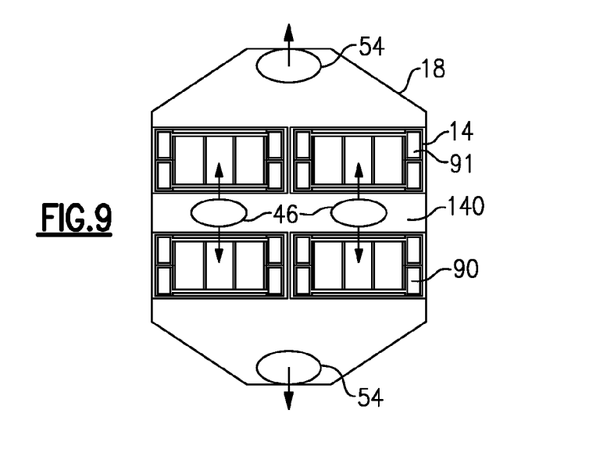
FIG. 9 shows a top schematic view of FIG. 8 fuel cell arrangement having multiple fuel cell stack assemblies.

Referring now to FIGS. 8 and 9, more than one fuel cell stack assembly 14 may be arranged within a duct 18. In this example, air enters in the compartment or plenum 140 via inlets 46 between the first group 90 of fuel cell stack assemblies 14 and second group 91 of fuel cell stack assemblies 14 and splits into two streams flowing in opposite directions, one stream moving through the channels 88 of a first group 90 of fuel cell stack assemblies 14 before exiting the duct 18, and the other stream moving through a second group 91 of fuel cell stack assemblies 14 before exiting the duct 18 via outlets 54.

Ring seals 96 seal the interfaces between the conduits 34a and 34b of adjacent ones of the cell stack assemblies 14 and the inlet and outlet pipes. The fuel cell stack assemblies 14 are packed in the duct 18 using air seals 100 configured to seal interfaces between the fuel cell stack assemblies 14 and the duct 18. The air seals 100 are made of ceramic fibrous materials that are used to provide flow resistance and essentially block air flow around the fuel cell stack assemblies 14 and in areas other than channels 88.

In one example, the conduits 34a and 34b attach to pipes (not shown) that carry fuel from the fuel supply reservoir 30 to the conduits 34a and from the conduits 34b to the spent fuel reservoir 38 or to corresponding connection points in a fuel cell system (not shown). The air inlet 46 and the air outlet 54 also attach to pipes (not shown) that carry air from the air supply 44 to the duct 18, and to the spent air reservoir 56. A person skilled in the art that has the benefit of this disclosure would understand how to suitably connect the fuel cell arrangement 10 to the fuel supply reservoir 30, the spent fuel reservoir 38, the air supply 44, and the spent air reservoir 56.

Manipulating the positions of the conduits 34a and 34b and the fuel channels 72 relative to the direction of air flow through the fuel cell stack assembly 14 provides several configurations, such as a co-flow arrangement where the fuel flows in the same direction as the air, counter-flow arrangement where the fuel flows in an opposite direction from the air, or cross-flow configurations where the fuel flows transverse to the air.

Referring to FIGS. 10-15, an example repeater unit 122 includes cell frame 170. The repeater unit 122 is stamped to establish the contours of the repeater unit 122. The repeater unit 122 holds a single fuel cell 126 and thus has a 1×1 matrix.

Figure 10:
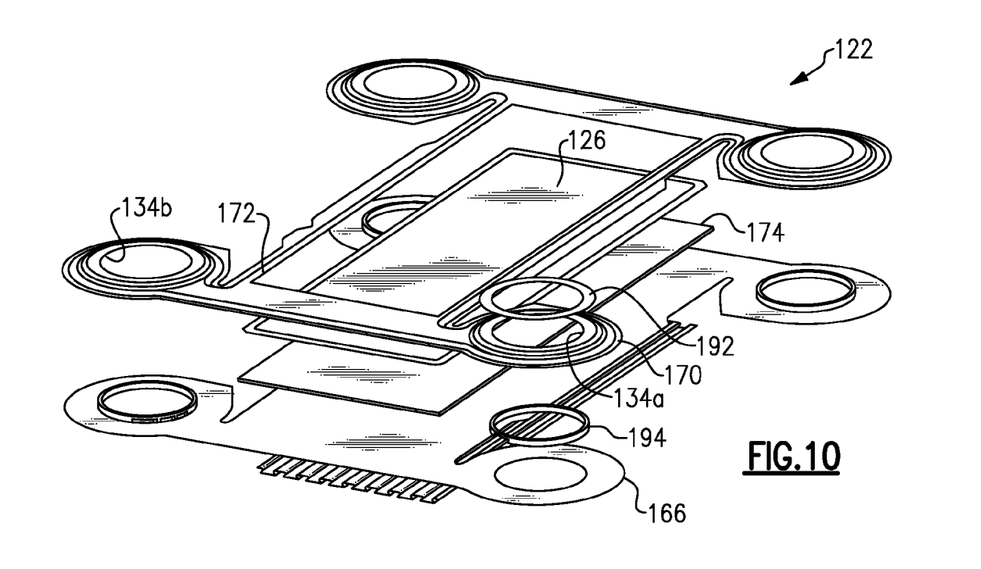
FIG. 10 shows an exploded view of another example repeater unit.
Figure 12:
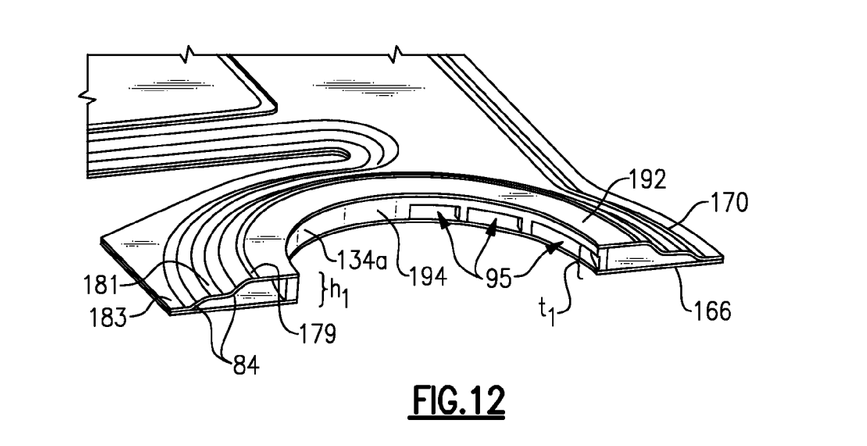
FIG. 12 shows a section view through line 12-12 of FIG. 11.

In this example, the cell frame 170 of the repeater unit 122 has a reinforcement zone having a first portion 179, a second portion 181, and a third portion 183 that are spaced relative to each other. The first portion 179, the second portion 181, and the third portion 183 are examples of the types of contours stamped into the repeater unit 122.

The first portion 179, the second portion 181, and the third portion 183 correspond to steps or tiers each having a different spacing of height relative to the separator plate 166. Transitions 84 between the first portion 179, the second portion 181, and the third portion 183 are radiused in this example. Other reinforcement zones may include additional portions to accommodate different spacings or stamping requirements.

To form the cell frame 170, a stamping operation deforms or moves the second portion 181 of the cell frame 170 away from the third portion 183, and the first portion 179 away from the third portion 183 and the second portion 181. The stamping operation also forms the fuel channel 172. The radiused transitions 84 facilitate material movement during the stamping operation. The multistep design of the frame stamping around the periphery of conduits 134a and 134b, eliminate the need to use C- or V-ring metallic structures for the formation of the primary fuel manifold conduits thus mitigating the possibility that the C- or V-ring structures may creep deform over time and lead to leakage. Similarly, this design reduces the thickness of the seal 192 to the range of 0.025 mm to 0.150 mm reduces the potential for catastrophic failure of the sealant material during thermal cycling. These features render the window frame stack design more durable and robust under both steady state conditions as well as under thermal cycling.

In this example, the distance between the first portion 179 and the third portion 183 corresponds to a height $h_1$, which is the approximate sum of the heights of the fuel cell 126, the anode side interconnect 174, any bonding materials that may be bond the anode side interconnect 174 to a separator plate 166 and to the anode electrode of the fuel cell 26, plus the height of the cathode side interconnect minus the effective height of the seal 192 that seals the top portion of the frame to the bottom surface of the adjacent separator plate 166.

The example inserts 194 have a thickness essentially equal to the height $h_1$ minus the thickness of the separator place 166 and the seal 192. The example inserts 194 establish a plurality of openings 95 configured to communicate flow between conduit 134a, the conduit 134b, and the fuel channel 172. The openings 95 are positioned and sized to achieve a desired flow.

During assembly, the example inserts 194 are spot-welded to the cell frame 170, the separator plate 166 or both to ensure that the openings 95 are properly oriented relative to the fuel channel 172.

The example inserts 194 are formed from a planar sheet of metallic material and then bent into the cylindrical shape shown. In another example, the inserts 194 are cut from a cylinder or tube of material. Inserts 194 are made of alloys closely related to the alloys used for the separator 166 and frame 170.

The example inserts 194 are formed from a planar sheet of metallic material and then bent into the cylindrical shape shown. In another example, the inserts 194 are cut from a cylinder or tube of material. Inserts 194 are made of alloys closely related to the alloys used for the separator 166 and frame 179.

Figure 13:
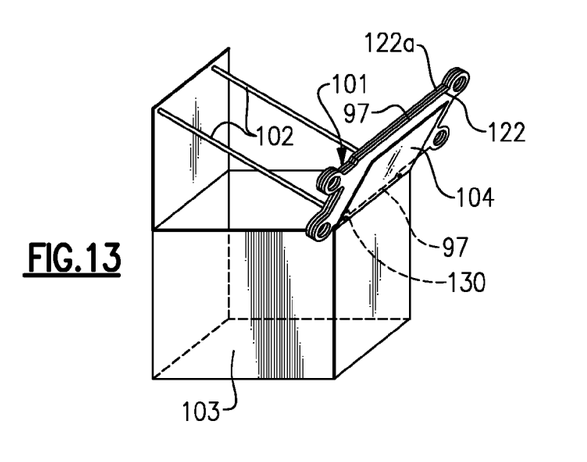
FIG. 13 shows an example stack assembly rig.

The example repeater unit 122 includes a plurality of protrusions 97 located on both sides of the repeater unit 122. A notch 130 is established on one side of the repeater unit. When assembling a fuel cell stack assembly 114, the notch 130 and protrusions 97 are positioned against alignment rods 102 in a suitable stack assembly rig 103. The notch 130 is received over the alignment rod 102 in this example. The notch 130 and protrusions 97 facilitate positioning the repeater unit 122 relative to another repeater unit 122a during assembly. Other examples of the repeater unit 122 may utilize cut-outs or other types of notches 130 and protrusions 97 to locating the repeater unit 122 during assembly.

In this example, the alignment rods 102 are supported by the stack assembly rig 103, which supports the weight of the rods and the repeater units 122 as they are stacked against the alignment rods 102. Truss-like lattice work (not shown) provides further support to the rods 102 in some examples.

In this example, the repeater unit 122 and 122a are sequentially stacked against a rig base plate 104 of the stack assembly rig 103 during assembly. The alignment rods 102 extend at right angles relative to the rig base plate 104. A stack current collector plate and an end or compression plate, not shown, against which the repeater units are stacked are preferably the first stack components placed against rig base plate 104 during stack assembly.

The example repeater unit 122 further includes notches 101. In this example, the notches 101 relieve stress during operation by separating the thermal strain experienced by the stamped geometry that make up conduits 134a and 134b from exerting strain to the corners of fuel cell 126.

Figure 14:
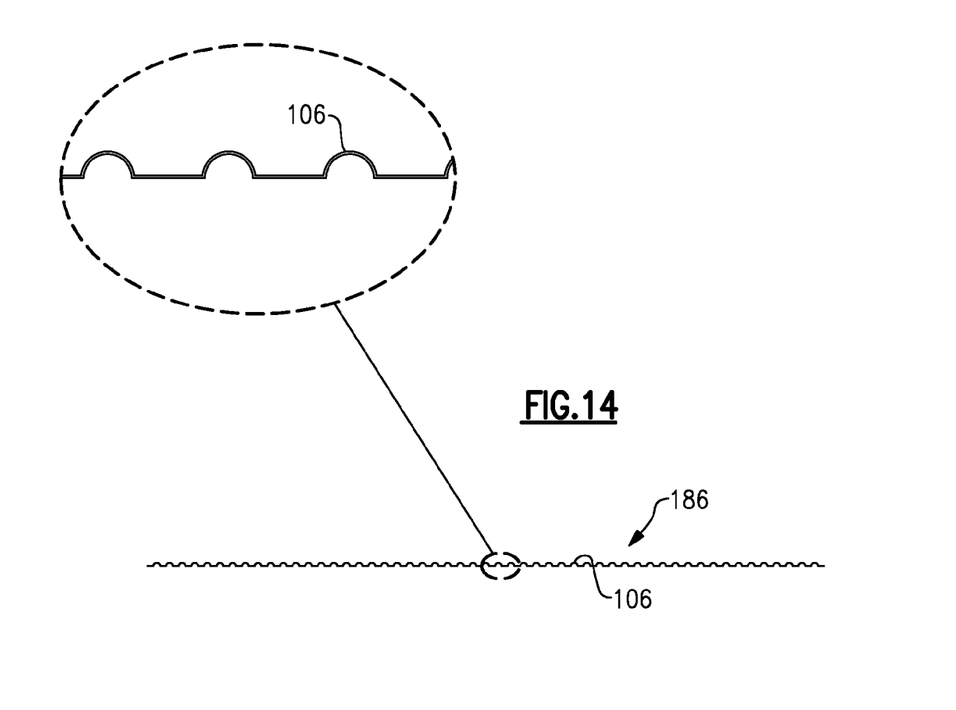
FIG. 14 shows a section view of an example interconnector.

Referring to FIG. 14, an example interconnect 186 has a plurality of rounded or hemispherical dimples 106 and is laser welded to the separator plate 166. The example dimples 106 have a radius of about 1.0 mm in this example, and each of the example dimples 106 is spaced about 3.0 mm from an adjacent one on the plurality of dimples 106. The dimple radius ranges from 0.5 mm to 2.5 mm, while the spacing between dimples ranges from 1 mm to 4 mm. Other examples of the interconnect 186 include truncated hemispherical dimples, conical dimples, truncated conical dimples, prismatic, i.e., hexagonal footprint with a flat top, or prismatic with a spherical segment top. In general, the footprint of the dimple, that is the shape of the dimple at the flat base plane, can have a cylindrical, ellipsoid, square, tetragonal, or polygonal geometry. In these other examples of interconnect 186 geometry the height of the dimple ranges from 0.5 to 2.5 mm. Notably, the compliance of the interconnect 186 can be adjusted by modifying wire diameters, the wire design, and the geometry of the dimples 106. The wire diameter for interconnect 186 ranges from 0.125 mm to 0.250 mm.

Figure 15:
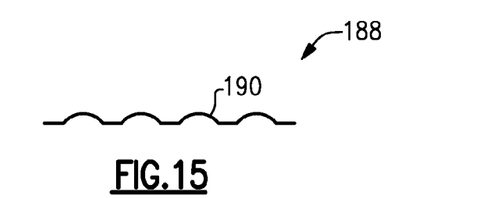
FIG. 15 shows a section view of another example interconnector.

The example interconnect 188 of FIG. 15 has a circular arc cross-section with dimples 190 that are shallower than the dimples 106. The dimples 190 are spaced about 2.0 mm apart in this example and have a radius of about 2.5 mm. The height of the dimples 190 is about 1.0 mm. The dimples 190 are shown as arcs from a circle in this example. In another example, the dimples 190 are arcs from parabolas, hyperbolas, or ellipses.

Although a preferred embodiment has been disclosed, a worker of ordinary skill in this art would recognize that certain modifications would come within the scope of this invention. For that reason, the following claims should be studied to determine the true scope and content of this invention.

We claim:

1. A fuel cell repeater comprising:
    a separator plate;
    a frame establishing at least a portion of a flow path that is configured to fluidly couple a fuel supply with at least one fuel cell held by the frame relative to the separator plate, the flow path having a flow path perimeter, the flow path within the flow path perimeter configured to direct flow across the at least one fuel cell within a first plane,
    the separator plate, the frame, or both establish at least one conduit that is positioned outside the flow path perimeter and is fluidly coupled with the flow path, the at least one conduit configured to direct flow within a second, different plane, wherein the planes are nonparallel; and
    an insert establishing a plurality of openings at an interface of the flow path and the at least one conduit, wherein the insert includes a portion extending circumferentially about a conduit perimeter of the at least one conduit, wherein the separator plate provides at least one side of the plurality of openings.

2. The fuel cell repeater of claim 1, wherein the plurality of openings are configured to communicate fuel between the flow path and the at least one conduit.

3. The fuel cell repeater of claim 1, wherein the at least one conduit has a circular cross section.

4. The fuel cell repeater of claim 1, wherein the insert has a rectangular axial cross-section.

5. The fuel cell repeater of claim 1, wherein all the plurality of openings are aligned with a fuel channel provided between the separator plate and the frame.

6. The fuel cell repeater of claim 1, wherein no portion of the at least one conduit is located within the flow path perimeter.

7. The fuel cell repeater of claim 1, wherein the plurality of openings are at an interface between the flow path perimeter and the at least one conduit.

\* \* \* \* \*